United States Patent
Kanazawa et al.

(10) Patent No.: US 8,165,623 B2
(45) Date of Patent: Apr. 24, 2012

(54) RADIO COMMUNICATION DEVICE

(75) Inventors: Masaru Kanazawa, Kawasaki (JP);
Tabito Tonooka, Kawasaki (JP);
Masatomo Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 435 days.

(21) Appl. No.: 12/405,540

(22) Filed: Mar. 17, 2009

(65) Prior Publication Data

US 2009/0233641 A1 Sep. 17, 2009

(30) Foreign Application Priority Data

Mar. 17, 2008 (JP) ................................ 2008-068476

(51) Int. Cl.
*H04M 1/00* (2006.01)
*G08B 1/08* (2006.01)
(52) U.S. Cl. ..................... 455/550.1; 455/421; 455/557; 340/539.1
(58) Field of Classification Search ............... 455/550.1, 455/421, 557; 340/539.1
See application file for complete search history.

(56) References Cited

U.S. PATENT DOCUMENTS

2006/0052098 A1* 3/2006 Lee et al. ................... 455/422.1

FOREIGN PATENT DOCUMENTS

JP 2007-19748 1/2007

* cited by examiner

*Primary Examiner* — Daniel D Chang
(74) *Attorney, Agent, or Firm* — Fujitsu Patent Center

(57) ABSTRACT

A radio communication device that outputs an alarm when a reception level of a radio wave from a wireless unit is less than a threshold value, includes a reception level measuring section for measuring the reception level of the radio wave transmitted from the wireless unit at certain times. A threshold value setting section for setting a first threshold value or a second threshold value less than the first threshold value based on a difference between the reception level of the radio wave measured a previous time and the reception level of the radio wave measured a subsequent time. An alarm output requesting section for causing an alarm output section to output an alarm if the reception level of the radio wave measured a subsequent time is less than the first threshold value or the second threshold value.

5 Claims, 7 Drawing Sheets

RADIO COMMUNICATION DEVICE

CROSS-REFERENCE TO RELATED APPLICATIONS

This application is based upon and claims the benefit of priority of the prior Japanese Patent Application No. 2008-068476, filed on Mar. 17, 2008, the entire contents of which are incorporated herein by reference.

FIELD

The present invention relates to, for example, a radio communication device that outputs an alarm when the reception level of a radio wave is less than a threshold value.

BACKGROUND

Japanese Laid-open Patent Publication No. 2007-19748, for example, discloses a system in which a mobile telephone unit sounds an alarm when the mobile telephone unit and a slave unit are equal to or more than a certain distance away from each other by making the mobile telephone unit having a receiving module and the slave unit communicate with each other periodically, as a measure for preventing misplacement of the mobile telephone unit, which is one example of the radio communication device. The mobile telephone unit disclosed in Japanese Laid-open Patent Publication No. 2007-19748 serves as a base unit in relation to the slave unit.

The system is configured as follows. The slave unit transmits a radio wave, and the base unit receives the radio wave from the slave unit and observes the signal strength of the received radio wave. When the signal strength of the received radio wave becomes less than a certain level, an alarm is sounded. The signal strength of the received radio wave is referred to as "RSSI" (Received Signal Strength Indication).

In actual use of the conventional system as described above, it is expected that the RSSI considerably decreases instantaneously in conditions where, for example, the base unit is placed on metal or where the radiation patterns of the base unit and the slave unit antennas have a null relationship to each other. The reason is that the antenna characteristics of the base unit considerably deteriorate by placing the base unit on metal. In the conventional system as described above, the RSSI may even become less than a certain level, that is, less than a threshold value, in other circumstances than when the base unit is misplaced. Thus, the conventional system has the problem where a false alarm is caused by a malfunction. The conventional system described in Japanese Laid-open Patent Publication No. 2007-19748 cannot cope with an abrupt variation of the RSSI, so the conventional system cannot resolve the problem of the false alarm caused by the malfunction.

SUMMARY

Accordingly, it is an object of the invention to provide a device to avoid the alarm malfunction.

According to an aspect of the invention, a radio communication device receives a radio wave transmitted from a wireless unit and outputs an alarm when a reception level of the radio wave is less than a threshold value. The radio communication device includes a reception level measuring section for measuring the reception level of the radio wave transmitted from the wireless unit at certain times; a threshold value setting section for calculating a difference between the reception level of the radio wave measured a previous time and the reception level of the radio wave measured a subsequent time, setting a first threshold value if the calculated difference is less than a given value, and setting a second threshold value less than the first threshold value if the calculated difference is equal to or greater than the given value; and an alarm output requesting section for comparing the reception level of the radio wave measured a subsequent time with the first threshold value or the second threshold value that is set by the threshold value setting section, and causing an alarm output section to output an alarm if the reception level of the radio wave measured a subsequent time is less than the first threshold value or the second threshold value set by the threshold value setting section.

The objects and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of apparatus of this disclosure will be described with reference to the drawings.

Embodiment 1

Figure 1:
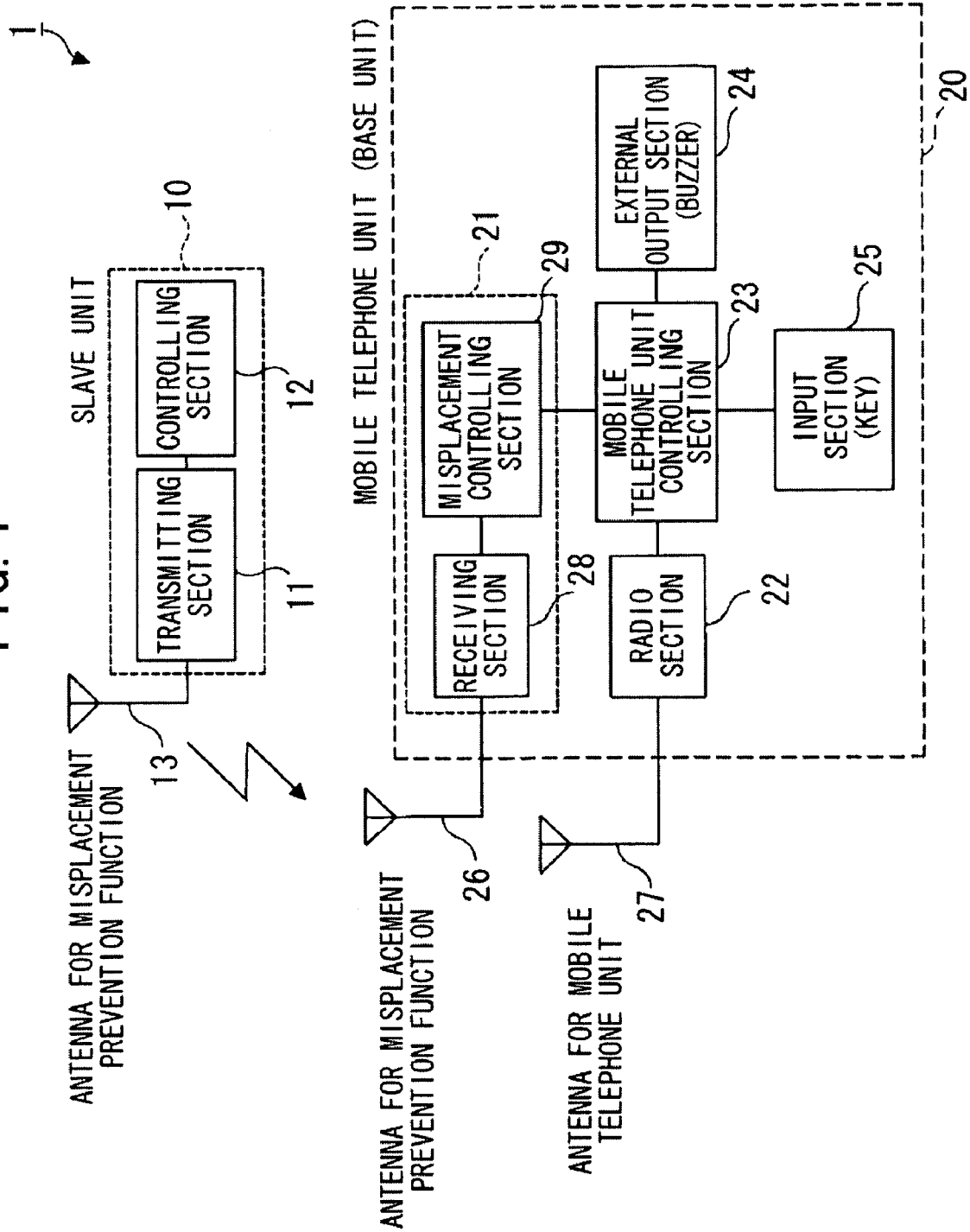
FIG. 1 is a system configuration diagram illustrating a first embodiment of a misplacement prevention system.

FIG. 1 is a system configuration diagram illustrating a first embodiment of a misplacement prevention system. The misplacement prevention system 1 illustrated in FIG. 1 includes a slave unit 10 and a base unit 20. The slave unit 10 is one example of a wireless unit. The base unit 20 may be a mobile telephone unit, which serves as one example of the mobile terminal device. The user carries the slave unit 10, for example, in a pocket of his/her clothes. The base unit 20 sounds an alarm when the slave unit 10 is equal to or more than a certain distance away from the base unit 20. Thus, the misplacement prevention system 1 is a system for preventing misplacement of the base unit 20.

The slave unit 10 includes a transmitting section 11, a controlling section 12, and a misplacement prevention function antenna 13. The base unit 20 includes a receiving module 21, a radio section 22, a mobile telephone unit controlling section 23, an external output section 24 such as a buzzer, an input section 25 such as a key, and a mobile telephone unit antenna 27. The receiving module 21 includes a misplacement prevention function antenna 26, a receiving section 28, and a misplacement controlling section 29.

In the slave unit 10, the controlling section 12 controls the transmitting section 11 so that the slave unit 10 transmits a radio wave that is a modulated wave containing unique information of the slave unit 10 at regular intervals from the misplacement prevention function antenna 13 at certain times. In the base unit 20, the misplacement controlling section 29 controls the receiving section 28 so that the base unit 20 receives the radio wave from the slave unit 10 by the misplacement prevention function antenna 26.

The misplacement controlling section 29 monitors the signal strength of the radio wave (hereinafter referred to as "RSSI" received from the slave unit 10. When the RSSI becomes less than a threshold value, for example when the wireless unit goes out of range, the misplacement controlling section 29 causes the external output section 24 to sound an alarm, i.e., to output an alarm, such as a buzzer via the mobile telephone unit controlling section 23.

Figure 2:
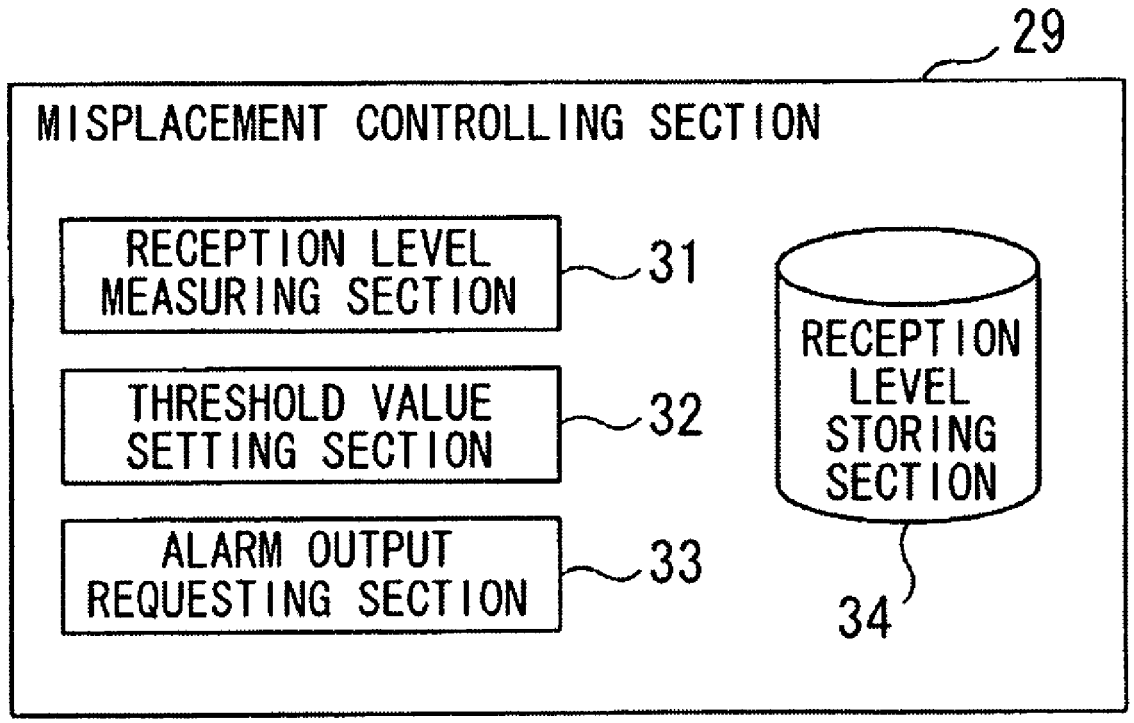
FIG. 2 is a block diagram illustrating one example of a misplacement controlling section.

FIG. 2 is a block diagram illustrating one example of a misplacement controlling section. The misplacement controlling section 29 includes a reception level measuring section 31, a threshold value setting section 32, an alarm output requesting section 33, and a reception level storing section 34. The reception level measuring section 31 measures the RSSI of the radio wave received from the slave unit 10 and stores it in the reception level storing section 34. The threshold value setting section 32 changes the threshold value, as will be described later, to avoid a malfunction of the alarm. The alarm output requesting section 33 causes an alarm, such as a buzzer, to sound from the external output section 24 via the mobile telephone unit controlling section 23 when the RSSI of the radio wave received from the slave unit 10 becomes less than the threshold value.

The following describes how the threshold value setting section 32 changes the threshold value to avoid malfunctioning of the alarm. The RSSI of the radio wave received from the slave unit 10 is believed to decrease by 20 dB or more when the RSSI of the radio wave received from the slave unit 10 is in such a condition that it changes greatly, for example, where the base unit 20 is placed on metal or where the misplacement prevention function antenna 13 of the slave unit 10 and the misplacement prevention function antenna 26 of the base unit 20 have a null relationship to each other in the radiation pattern. Note that the value 20 dB is merely an example.

Considering the walking speed of a human and the transmission loss of radio wave, it is believed that the RSSI of the radio wave received from the slave unit 10 may decrease by about several dB/second at most. It is believed unlikely that the RSSI instantaneously decreases by an amount equal to or more than 20 dB.

Accordingly, by observing the amount of change of RSSI per unit time, the misplacement controlling section 29 can determine whether or not the decrease of the RSSI is due to the placement of the base unit 20 in an adverse environment. That is, the misplacement controlling section 29 can determine whether the decrease of the RSSI is due to the transmission loss increase that is caused because the user who carries the slave unit 10 moves away from the base unit 20 or due to the placement of the base unit 20 in an adverse environment such as where the base unit 20 is placed on metal or where the misplacement prevention function antenna 13 of the slave unit 10 and the misplacement prevention function antenna 26 of the base unit 20 have a null relationship in the radiation pattern.

When it is determined that the decrease of the RSSI is due to the placement of the base unit 20 in an adverse environment, the threshold value setting section 32 sets, for example, a threshold value that is 20 dB lower than the threshold value set in the case when it is determined that the decrease of the RSSI is due to an increase of transmission loss because of the user moving away from the base unit 20. Thereby, malfunction of the alarm is avoided. The threshold value setting section 32 judges that the base unit 20 has been released from the adverse environment when the RSSI of the radio wave received from the slave unit 10 abruptly recovers. Then, the threshold value setting section 32 sets the threshold value back to the threshold value set in the case when it is determined that the decrease of the RSSI is due to an increase of transmission loss because of the user moving away from the base unit 20.

The threshold value setting section 32 determines whether the decrease of the RSSI is due to the transmission loss increase or due to the placement of the base unit 20 in an adverse environment, and can avoid malfunction of the alarm by changing the threshold value based on the result of the determining.

Figure 3:
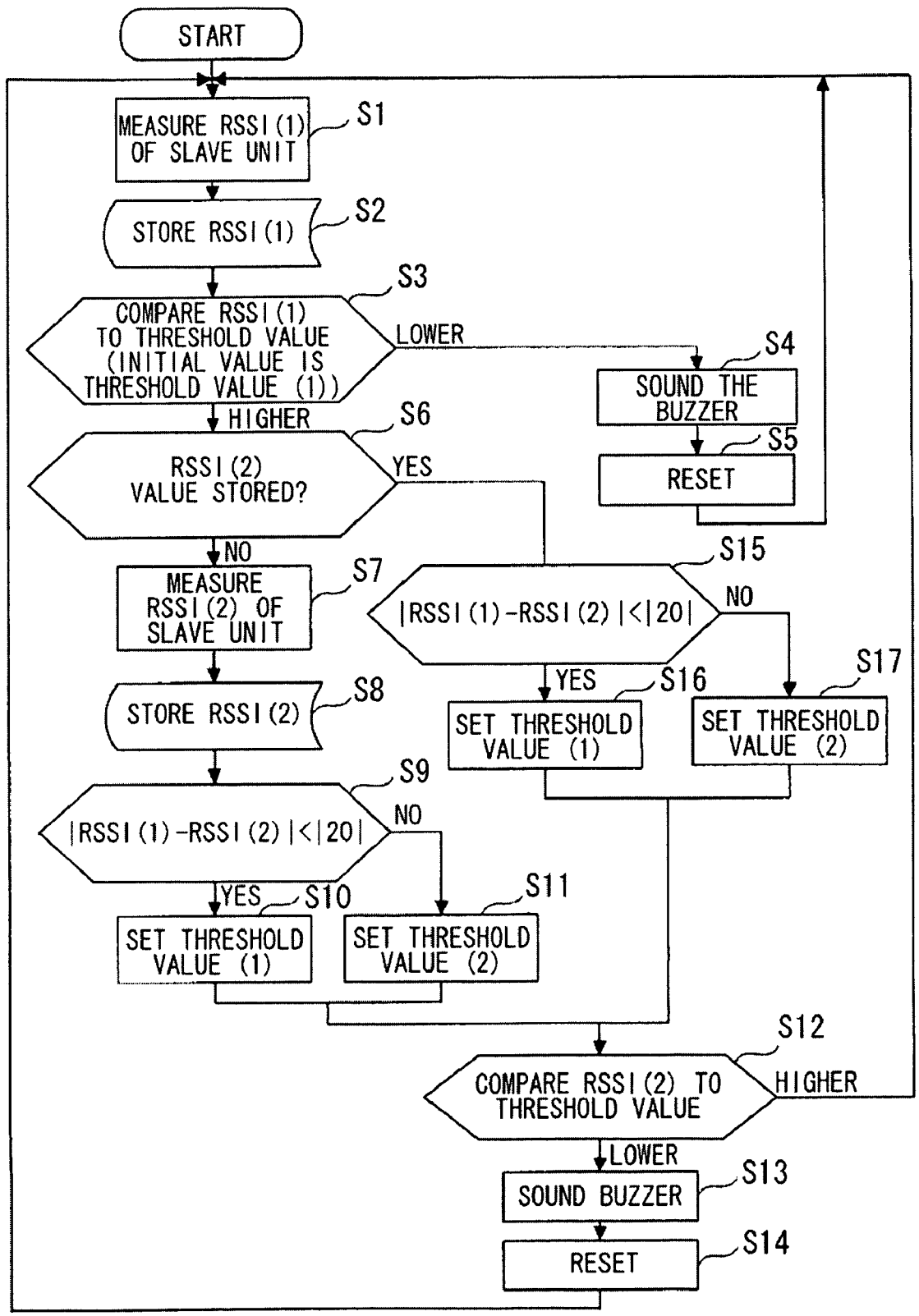
FIG. 3 is a flowchart illustrating one example of a process flow of the misplacement controlling section.

FIG. 3 is a flowchart illustrating one example of a process flow of the misplacement controlling section. The process proceeds to Step S1, where the reception level measuring section 31 measures RSSI(1) of the radio wave received from the slave unit 10. The process proceeds to Step S2, where the reception level measuring section 31 stores the measured RSSI(1) in the reception level storing section 34.

The process proceeds to Step S3, where the alarm output requesting section 33 compares the RSSI(1) stored at Step S2 with the threshold value. The initial value of the threshold value is a threshold value (1), which is set in the case when the decrease of the RSSI is due to an increase of transmission loss because of the user moving away from the base unit 20.

If the RSSI(1) stored at Step S2 is lower than the threshold value, the process proceeds to Step S4, where the alarm output requesting section 33 causes the output section 24 to output an alarm, such as a buzzer, via the mobile telephone unit controlling section 23. The process proceeds to Step S5, where the misplacement controlling section 29 is reset based on the operation by the user from the input section 25, such as a key, via the mobile telephone unit controlling section 23. Thereafter, the process returns to Step S1.

If the RSSI(1) stored at Step S2 is equal to or higher than the threshold value, the process proceeds to Step S6, where the reception level measuring section 31 decides whether or not the RSSI(2) of the radio wave received from the slave unit 10 is stored in the reception level storing section 34.

If the RSSI(2) of the radio wave received from the slave unit 10 is not stored in the reception level storing section 34, the process proceeds to Step S7, where the reception level measuring section 31 measures the RSSI(2) of the radio wave received from the slave unit 10. The process proceeds to Step S8, where the reception level measuring section 31 stores the measured RSSI(2) in the reception level storing section 34.

The process proceeds to Step S9, where the threshold value setting section 32 calculates the difference between the RSSI(1) stored in the reception level storing section 34 at Step S2 and the RSSI(2) stored in the reception level storing section 34 at Step S8, to decide whether or not the calculated difference is less than 20 dB. If the calculated difference is less than 20 dB, the process proceeds to Step S10, where the threshold value setting section 32 sets the threshold value (1). If the calculated difference is not less than 20 dB, the process proceeds to Step S11, where the threshold value setting section 32 sets a threshold value (2). The threshold value (2) is a threshold value set in the case when the decrease of the RSSI is due to the placement of the base unit 20 in an adverse environment.

At Step S6, if the RSSI(2) of the radio wave received from the slave unit 10 is stored in the reception level storing section 34, the process proceeds to Step S15, where the threshold value setting section 32 calculates the difference between the RSSI(1) and the RSSI(2) that are stored in the reception level storing section 34, to decide whether or not the calculated difference is less than 20 dB. If the calculated difference is less than 20 dB, the process proceeds to Step S16, where the threshold value setting section 32 sets the threshold value (1). If the calculated difference is not less than 20 dB, the process proceeds to Step S17, where the threshold value setting section 32 sets the threshold value (2).

Subsequent to Steps S10, S11, S16, and S17, the process proceeds to Step S12, where the alarm output requesting section 33 compares the RSSI(2) stored in the reception level storing section 34 to the threshold value (1) or the threshold value (2) that is set at one of Steps S10, S11, S16, or S17.

If the RSSI(2) stored in the reception level storing section 34 is lower than the threshold value (1) or the threshold value (2) that is set at one of Steps S10, S11, S16, or S17, the process proceeds to Step S13, where the alarm output requesting section 33 causes the external output section 24 to sound an alarm, such as a buzzer, via the mobile telephone unit controlling section 23. The process proceeds to Step S14, where the misplacement controlling section 29 is reset based on the operation by the user from the input section 25, such as a key, via the mobile telephone unit controlling section 23. Thereafter, the process returns to Step S1. If the RSSI(2) stored in the reception level storing section 34 is equal to or higher than the threshold value (1) or the threshold value (2) that is set at one of Steps S10, S11, S16, or S17, the misplacement controlling section 29 returns to Step S1.

The misplacement controlling section 29 includes the reception level storing section 34 and stores the measured RSSI(1) and RSSI(2) alternately, as illustrated in the flowchart of FIG. 3. The RSSI(1) is one example of the reception level of the radio wave measured a previous. The RSSI(2) is one example of the reception level of the radio wave measured a subsequent time.

The threshold value setting section 32 compares RSSI(2) with RSSI(1) that is stored. If the difference therebetween is less than 20 dB, the threshold value setting section 32 sets the threshold value (1) to make the alarm output requesting section 33 use the threshold value (1). If the difference therebetween is equal to or greater than 20 dB, the threshold value setting section 32 sets the threshold value (2) to make the alarm output requesting section 33 use the threshold value (2). The relationship between the threshold value (1) and the threshold value (2) is threshold value (1)>threshold value (2). The threshold value (2) is a threshold value in the case when the decrease of the RSSI is determined to be due to the placement of the base unit 20 in an adverse environment, and the threshold value (2) is set at a value such that the alarm does not malfunction.

Figure 4:
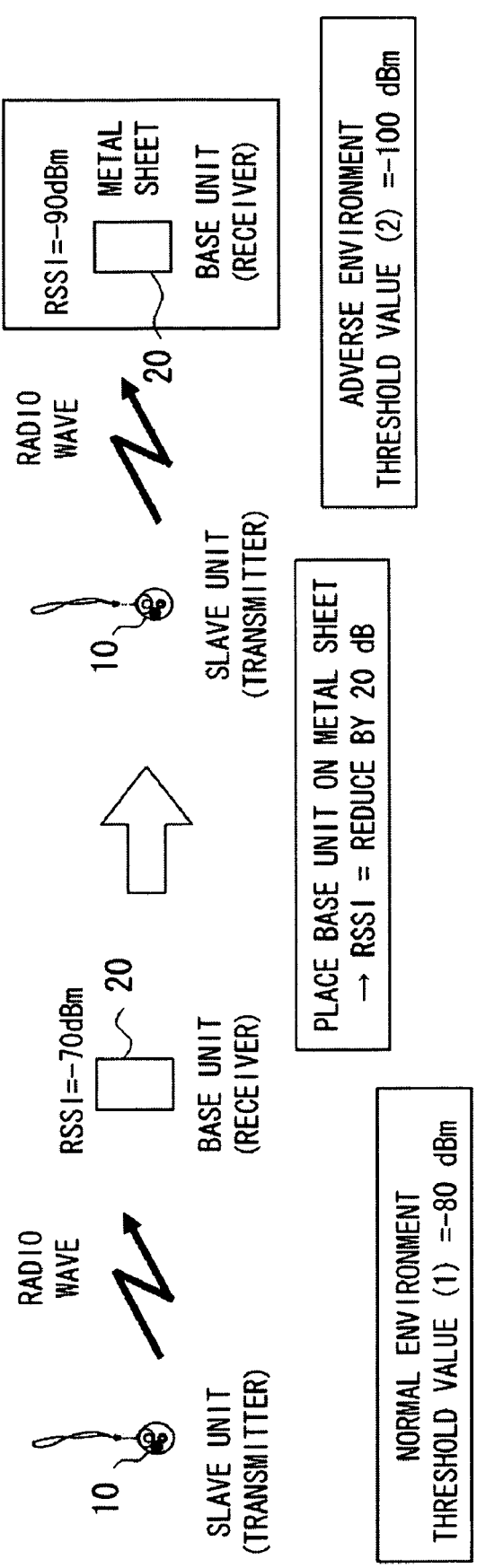
FIG. 4A is a view illustrating an operation of the misplacement prevention system in a normal environment which is not an adverse environment.
FIG. 4B is a view illustrating an operation of the misplacement prevention system in an adverse environment.

FIG. 4 is a schematic illustration for illustrating the operation of the misplacement prevention system. FIG. 4A shows an operation of the misplacement prevention system in a normal environment which is not an adverse environment. FIG. 4B shows an operation of the misplacement prevention system in an adverse environment where the base unit is placed on metal or where the misplacement prevention function antenna 13 of the slave unit 10 and the misplacement prevention function antenna 26 of the base unit 20 have a null relationship in the radiation pattern.

In FIGS. 4A and 4B, the threshold value (1) for the normal environment is set at, for example, −80 dBm, whereas the threshold value (2) for an adverse environment is set at, for example, −100 dBm. In FIG. 4A, the RSSI of the radio wave received from the slave unit 10 is −70 dBm, which is greater than the threshold value (1) −80 dBm, and therefore, the alarm does not operate.

If the base unit 20 is placed on a metal sheet while keeping the same distance relationship between the slave unit 10 and the base unit 20 and keeping the same threshold value (1) for the normal environment illustrated in FIG. 4A, the base unit 20 is in an adverse environment. In the base unit 20, for example, the antenna characteristics of the misplacement prevention function antenna 26 deteriorates by 20 dB, so the RSSI of the radio wave received from the slave unit 10 becomes −90 dBm. As a consequence, the RSSI of the radio wave received by the base unit 20 from the slave unit 10 is lower than the threshold value (1) by 10 dB, causing the alarm to malfunction.

In view of this, as illustrated in FIG. 4B, the base unit 20 utilizes the adverse environment threshold value (2) when it is placed in an adverse environment. In the base unit 20, for example, the antenna characteristics of the misplacement prevention function antenna 26 deteriorates by 20 dB, so the RSSI of the radio wave received from the slave unit 10 becomes −90 dBm; however, the RSSI is 10 dB higher than the threshold value (2) −100 dBm, so the alarm does not malfunction.

Embodiment 1 has described the case in which the base unit 20, which is the reception side, is placed in an adverse environment. However, the case in which the slave unit 10 is placed in an adverse environment is also similar. Thus, the misplacement prevention system 1 of Embodiment 1 may avoid alarm malfunctions and may enhance reliability.

Embodiment 2

Figure 5:
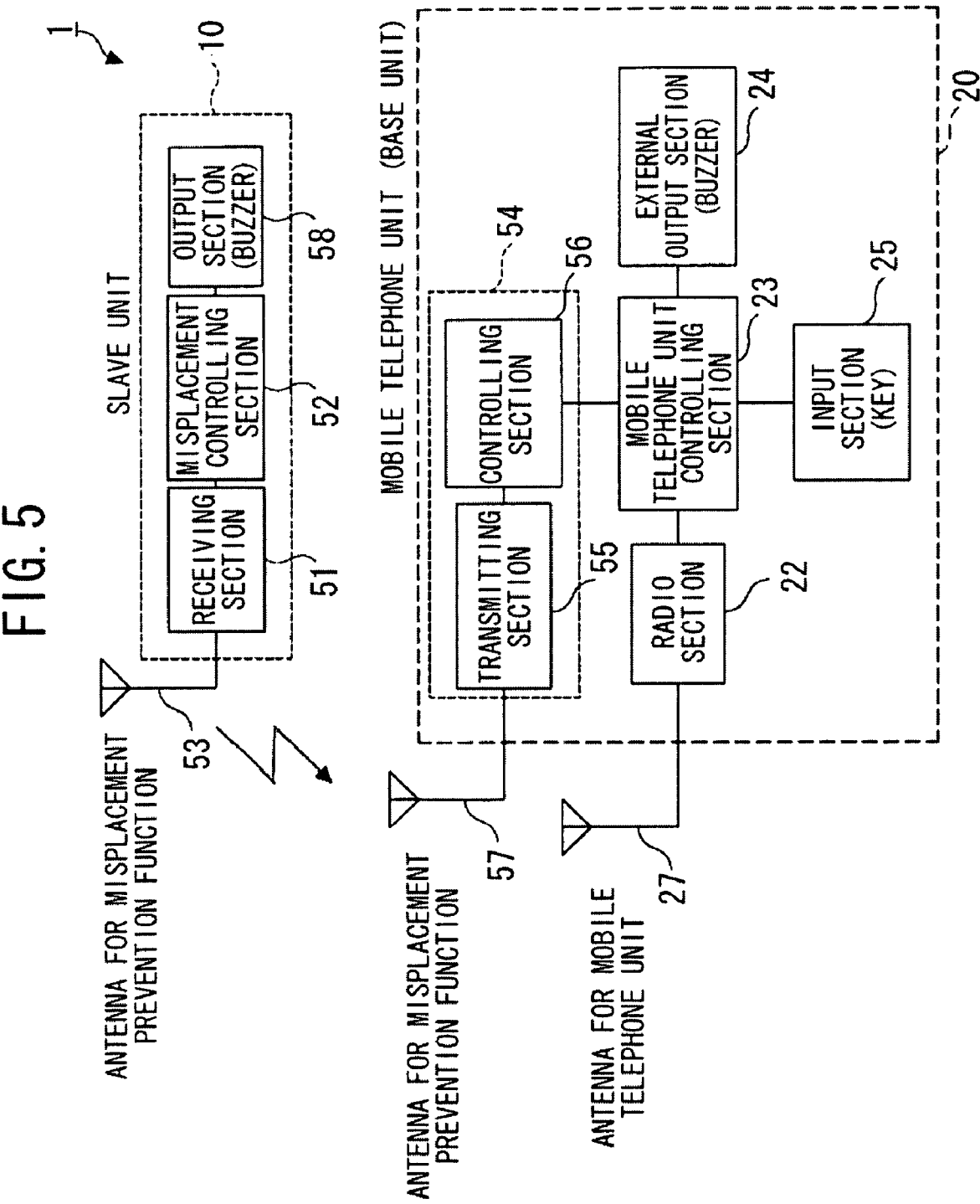
FIG. 5 is a system configuration diagram illustrating a second embodiment of the misplacement prevention system.

FIG. 5 is a system configuration diagram illustrating a second embodiment of the misplacement prevention system. The misplacement prevention system 1 of FIG. 5 is the same as the misplacement prevention system 1 of FIG. 1 except for some parts thereof. The same parts are designated by the same reference numerals, and the explanation thereof will be omitted as appropriate.

Like the misplacement prevention system 1 of FIG. 1, the misplacement prevention system 1 of FIG. 5 includes a slave unit 10 and a base unit 20. The slave unit 10 includes a receiving section 51, a misplacement controlling section 52, a misplacement prevention function antenna 53, and an output section 58. The receiving section 51, the misplacement controlling section 52, and the misplacement prevention function antenna 53 correspond to the receiving section 28, the misplacement controlling section 29, and the misplacement prevention function antenna 26 of the misplacement prevention system 1 of FIG. 1, respectively.

The base unit 20 includes a transmitting module 54, a radio section 22, a mobile telephone unit controlling section 23, an external output section 24 such as a buzzer, an input section 25 such as a key, and a mobile telephone unit antenna 27. The transmitting module 54 includes a transmitting section 55, a controlling section 56, and a misplacement prevention function antenna 57. The transmitting section 55, the controlling section 56, and the misplacement prevention function antenna 57 correspond to the transmitting section 11, the controlling section 12, and the misplacement prevention function antenna 13 of the misplacement prevention system 1 of FIG. 1, respectively.

In the base unit 20, the controlling section 56 controls the transmitting section 55 so that the base unit 20 transmits a radio wave that is a modulated wave containing unique information about the base unit 20 at regular intervals from the misplacement prevention function antenna 57 at certain times. In the slave unit 10, the misplacement controlling section 52 controls the receiving section 51 so that the slave unit 10 receives the radio wave from the base unit 20 by the misplacement prevention function antenna 53.

The misplacement controlling section 52 monitors the signal strength (RSSI) of the radio wave received from the base unit 20. When the RSSI becomes less than a threshold value, the misplacement controlling section 52 causes the output section 58 to sound an alarm such as a buzzer. The block diagram of the misplacement controlling section 52 is the same as the block diagram of FIG. 2, so the description thereof will be omitted. The process flow of the misplacement controlling section 52 is also the same as the flowchart of FIG. 3, so the description thereof will be omitted.

Thus, the misplacement controlling section 52 of the slave unit 10 determines whether the decrease of the RSSI is due to the transmission loss increase or due to the placement of the base unit 20 in an adverse environment, and the misplacement controlling section 52 can avoid an alarm malfunction by changing the threshold value based on the result of the determining.

As in Embodiment 1, Embodiment 2 can handle both of the case in which the slave unit 10, which is the reception side, is placed in an adverse environment, and the case in which the base unit 20, which is the transmission side, is placed in an adverse environment. Thus, the misplacement prevention system 1 of Embodiment 2 can avoid an alarm malfunction and can enhance reliability.

Embodiment 3

Figure 6:
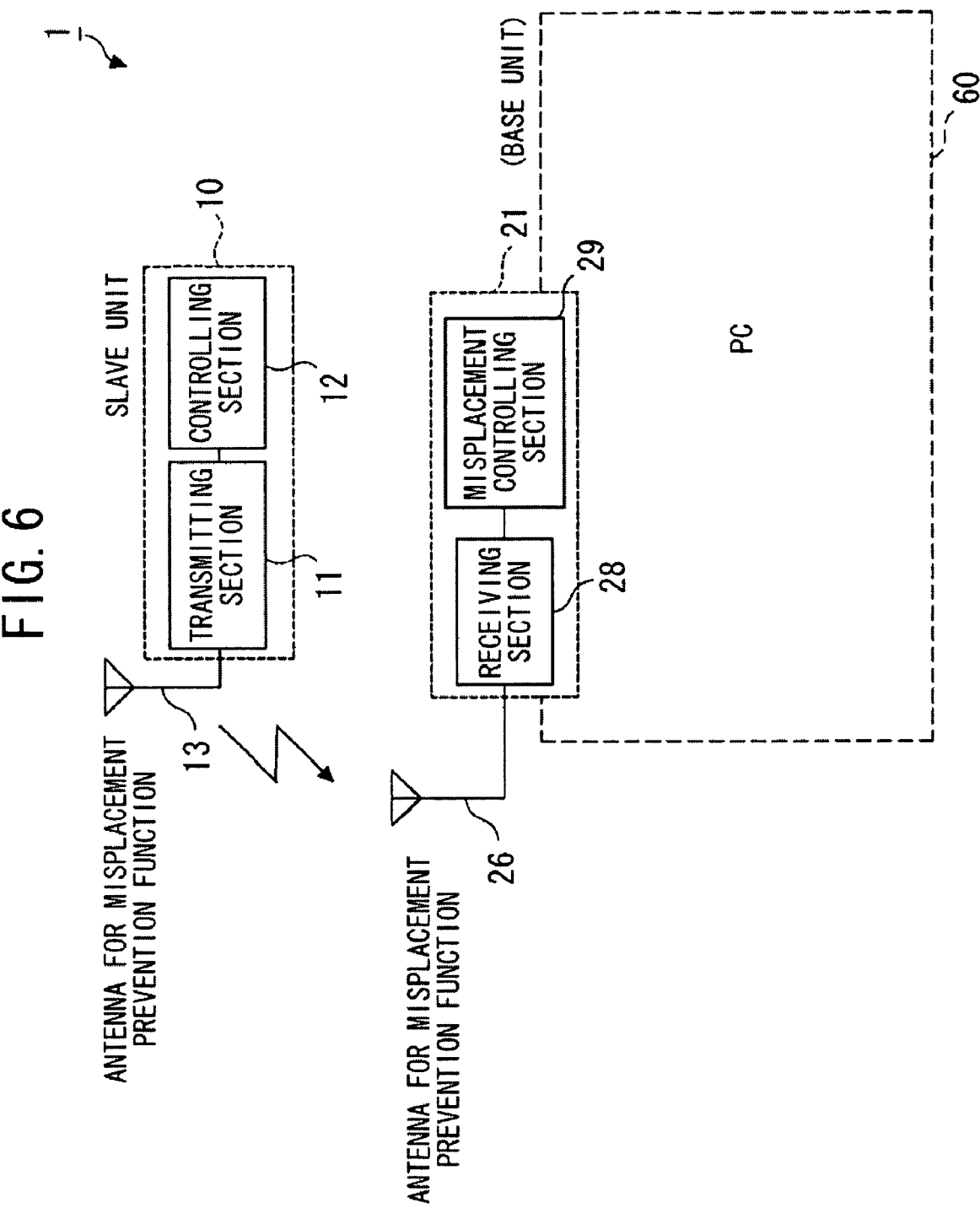
FIG. 6 is a system configuration diagram illustrating a third embodiment of the misplacement prevention system.

FIG. 6 is a system configuration diagram illustrating a third embodiment of the misplacement prevention system. A misplacement prevention system 1 of FIG. 6 includes a slave unit 10 and a base unit 60. The slave unit 10 is one example of the wireless unit. The base unit 60 may be a personal computer (hereinafter referred to as "PC"), which serves as one example of an information process apparatus. The user carries the slave unit 10, for example, in a pocket of his/her clothes. The slave unit 10 causes the base unit 60 to output an alarm when the slave unit 10 is equal to or more than a certain distance away from the base unit 60, thereby preventing misplacement of the base unit 60.

The slave unit 10 includes a transmitting section 11, a controlling section 12, and a misplacement prevention function antenna 13. The base unit 60 includes a receiving module 21. The receiving module 21 may be either incorporated in the base unit 60, or a PC card or an external device that can be connected to the base unit 60 so as to be capable of data communication.

The receiving module 21 includes a misplacement prevention function antenna 26, a receiving section 28, and a misplacement controlling section 29. In the slave unit 10, the controlling section 12 controls the transmitting section 11 so that the slave unit 10 transmits a radio wave that is a modulated wave containing unique information about the slave unit 10 at regular intervals from the misplacement prevention function antenna 13 at certain times. In the base unit 60, the misplacement controlling section 29 controls the receiving section 28 so that the base unit 60 receives the radio wave from the slave unit 10 by the misplacement prevention function antenna 26.

The misplacement controlling section 29 monitors the signal strength (RSSI) of the radio wave received from the slave unit 10. When the RSSI becomes less than a threshold value, for example, when the wireless unit is out of range, the misplacement controlling section 29 causes the base unit 60 to sound an alarm such as a buzzer. When the transmitting module 21 includes an external output section, which is not illustrated in the drawings, the misplacement controlling section 29 may cause the external output section to sound an alarm such as a buzzer.

The block diagram of the misplacement controlling section 29 is the same as the block diagram of FIG. 2, so the description thereof will be omitted. The process flow of the misplacement controlling section 29 is also the same as the flowchart of FIG. 3, so the description thereof will be omitted.

Figure 7:
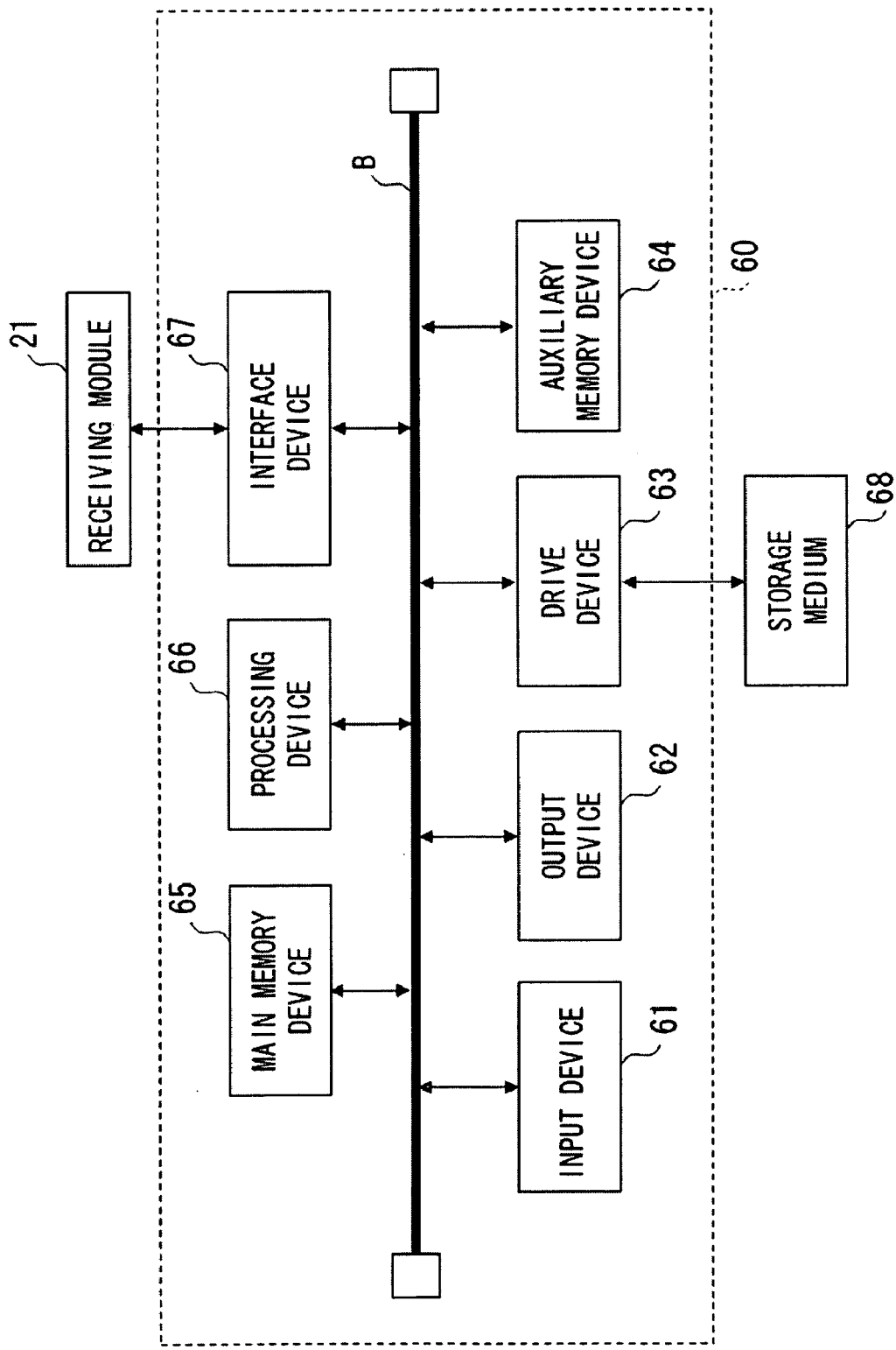
FIG. 7 is a diagram illustrating one example of the hardware configuration of a personal computer in which a misplacement controlling section is realized by a misplacement prevention program.

In FIG. 6, the transmitting module 21 includes the misplacement controlling section 29. However, the misplacement controlling section 29 may be implemented by a misplacement prevention program executed by the base unit 60. FIG. 7 is a diagram illustrating one example of the hardware configuration of a personal computer in which a misplacement controlling section is realized by a misplacement prevention program.

The base unit 60 includes an input device 61, an output device 62, a drive device 63, an auxiliary memory device 64, a main memory device 65, a processing section 66, and an interface device 67, which are interconnected with each other by a bus B.

The input device 61 may be a device such as a keyboard or a mouse used for inputting various signals. The output device 62 may be a device such as a display device, used for displaying various windows and data. The interface device 67 may be used, for example, for connecting the base unit 60 to the receiving module 21.

The misplacement prevention program is a part of various programs for controlling the base unit 60. The misplacement prevention program may be provided by, for example, distributing a recording medium 68 or by downloading the program from a network. Various types of recording media, such as recording media that record information optically, electrically, or magnetically, such as CD-ROMs, flexible disks, and magneto optical disks, and semiconductor memories that record information electrically, such as ROMs and flash memories may be used for the recording medium.

When the recording medium 68 that records the misplacement prevention program is set in the drive device 63, the misplacement prevention program is installed in the auxiliary memory device 64 from the recording medium 68 via the drive device 63. The misplacement prevention program downloaded from a network is likewise installed in the auxiliary memory device 64.

The auxiliary memory device 64 stores the installed misplacement prevention program and also stores necessary files, data, and the like. The main memory device 65 read outs the misplacement prevention program from the auxiliary memory device 64 upon starting, and stores the misplacement prevention program. The processing section 66 implements various processes of the misplacement controlling section 29, such as the processes described above, according to the misplacement prevention program stored the main memory device 65.

Thus, the misplacement controlling section 29 of the base unit 60 determines whether the decrease of the RSSI is due to the transmission loss increase or due to the placement of the base unit 60 in an adverse environment, and the misplacement controlling section 29 can avoid an alarm malfunction by changing the threshold value based on the result of the determining. As in Embodiment 1, Embodiment 3 can handle both of the case in which the slave unit 10, which is the transmission side, is placed in an adverse environment, and the case in which the base unit 60, which is the reception side, is placed in an adverse environment. Moreover, in Embodiment 3, the base unit 20 may be the transmission side and the slave unit 10 may be the reception side, as in Embodiment 2. Thus, the misplacement prevention system 1 of Embodiment 3 can avoid malfunctioning of the alarm and can enhance reliability.

Embodiments 1 through 3 have described the examples in which the misplacement prevention system 1 sounds an alarm when the RSSI of the received radio wave becomes less than a threshold value. However, a configuration may also be employed in which the misplacement prevention system 1 causes the base unit 20 to become unusable when the RSSI of the received radio wave becomes less than a threshold value.

All examples and conditional language recited herein are intended for pedagogical purposes to aid the reader in understanding the invention and the concepts contributed by the inventor to furthering the art, and are to be constructed as being without limitation to such specifically recited examples and condition, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A radio communication device comprising:
   a reception level measuring section for measuring a reception level of a radio wave transmitted from a wireless unit at certain times;
   a threshold value setting section for calculating a difference between the reception level of the radio wave measured a previous time and the reception level of the radio wave measured a subsequent time, setting a first value as a threshold value when the calculated difference is less than a given value, and setting a second value, less than the first threshold value, as the threshold value when the calculated difference is equal to or greater than the given value; and
   an alarm output requesting section for causing an alarm output section to output an alarm when the reception level of the radio wave measured the subsequent time is less than the threshold value set by the threshold value setting section.

2. The radio communication device according to claim 1, wherein the alarm output requesting section compares the reception level of the radio wave measured the previous time and the threshold value, and outputs an alarm to an alarm output section when the reception level of the radio wave measured the previous time is less than the threshold value.

3. The radio communication device according to claim 1, wherein a receiving section for receiving the radio wave transmitted from the wireless unit receives a radio wave containing unique information about the wireless unit.

4. A radio communication device comprising:
   a reception level measuring section for measuring a reception level of a received radio wave at certain times;
   a threshold value setting section for calculating a difference between a reception level of the radio wave that is measured at a first timing and a reception level of the radio wave that is measured at a second timing that is later than the first timing, and setting a first value as the threshold value when the calculated difference is less than a given value, and setting a second value that is less than the first value as the threshold value when the calculated difference is equal to or greater than a given value; and
   an alarm output requesting section for causing an alarm output section to output an alarm when the reception level of the radio wave measured a subsequent time is less than the threshold value set by the threshold value setting section.

5. The radio communication device according to claim 4, wherein the radio communication device is either a mobile telephone unit or a slave unit for a mobile telephone unit.

* * * * *